B. M. W. HANSON.
MILLING MACHINE.
APPLICATION FILED MAR. 26, 1919.

1,331,708.

Patented Feb. 24, 1920.

Inventor
B. M. W. Hanson,
By Hutt Sutherland
Attorney

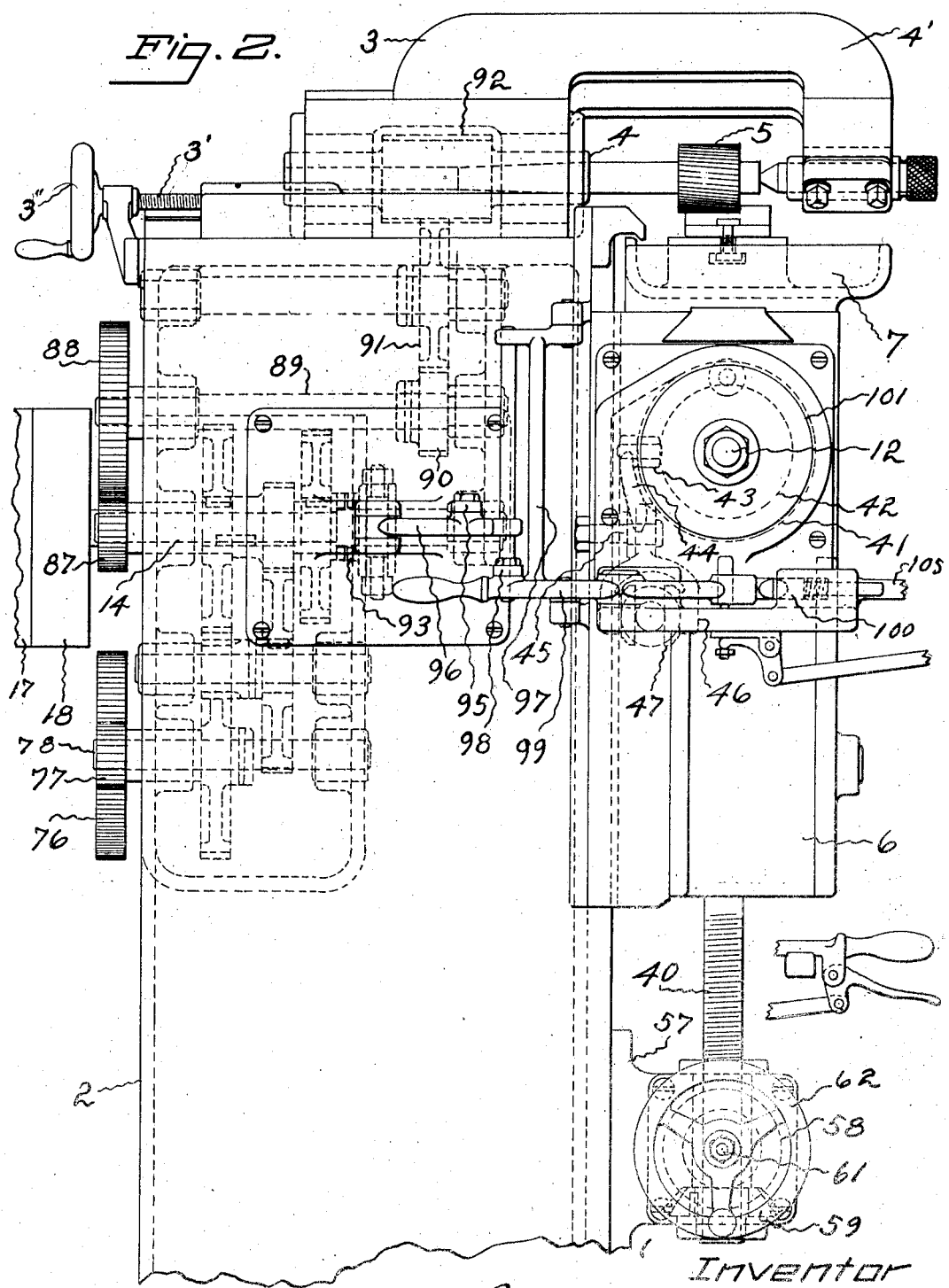

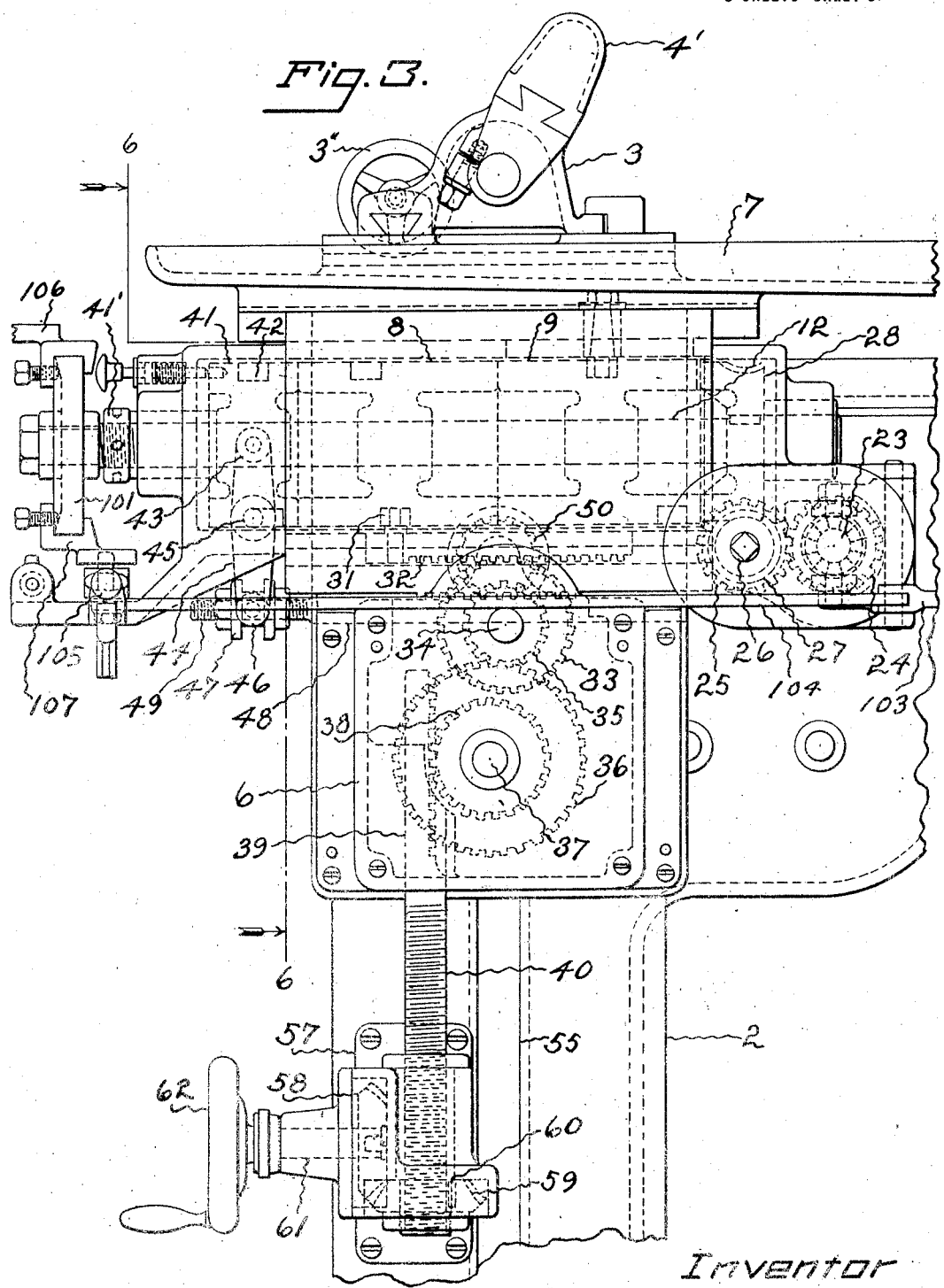

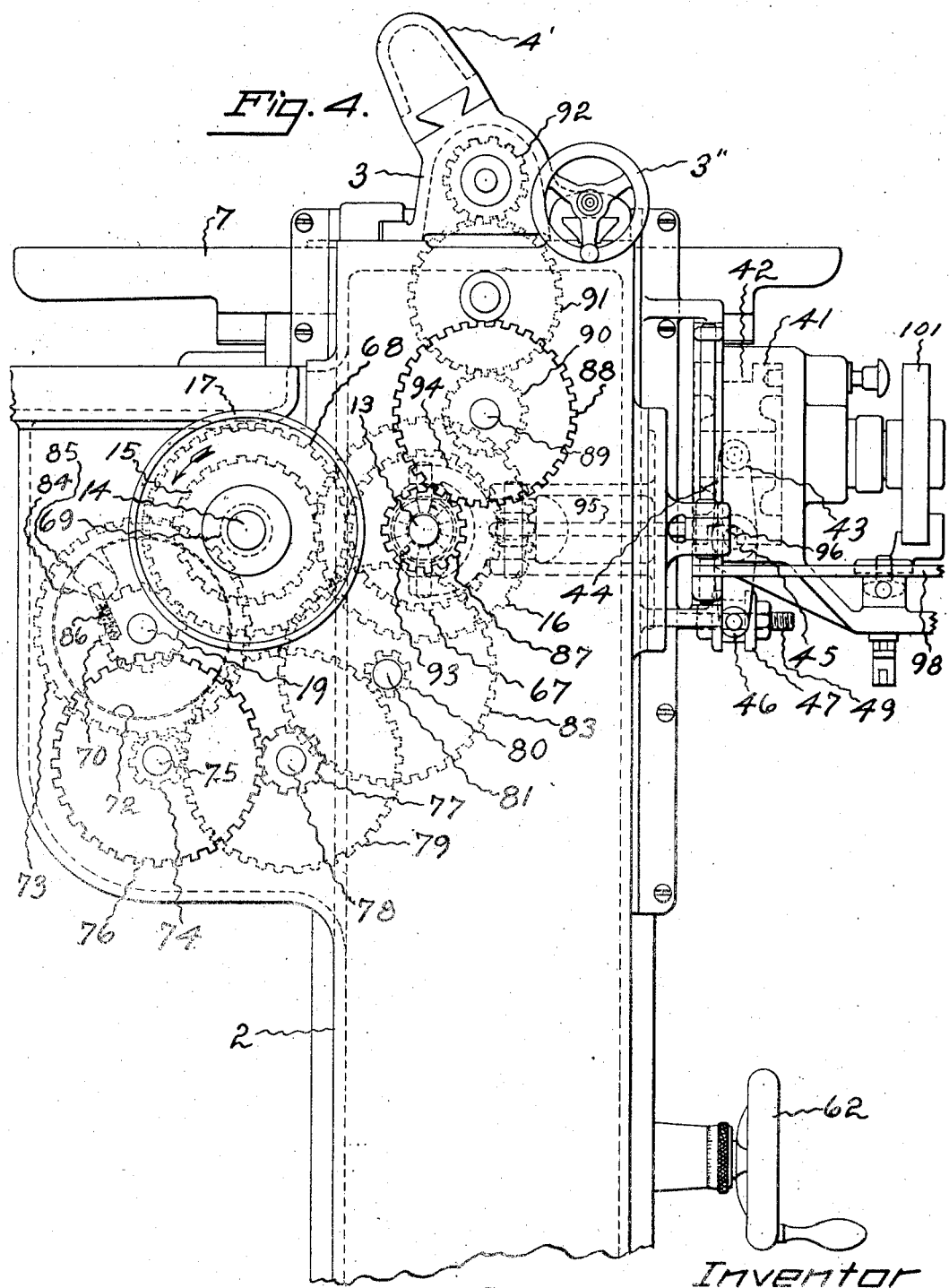

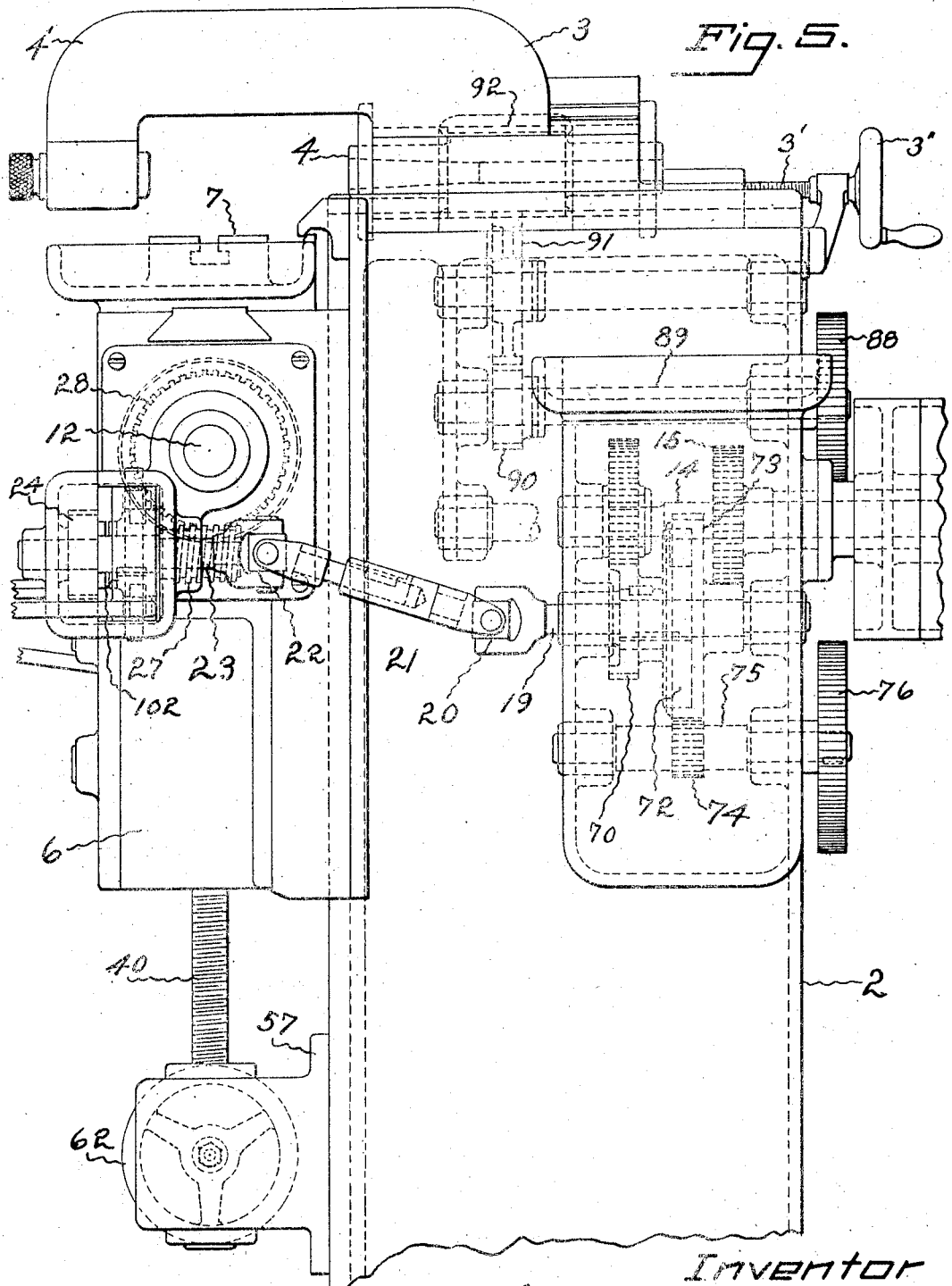

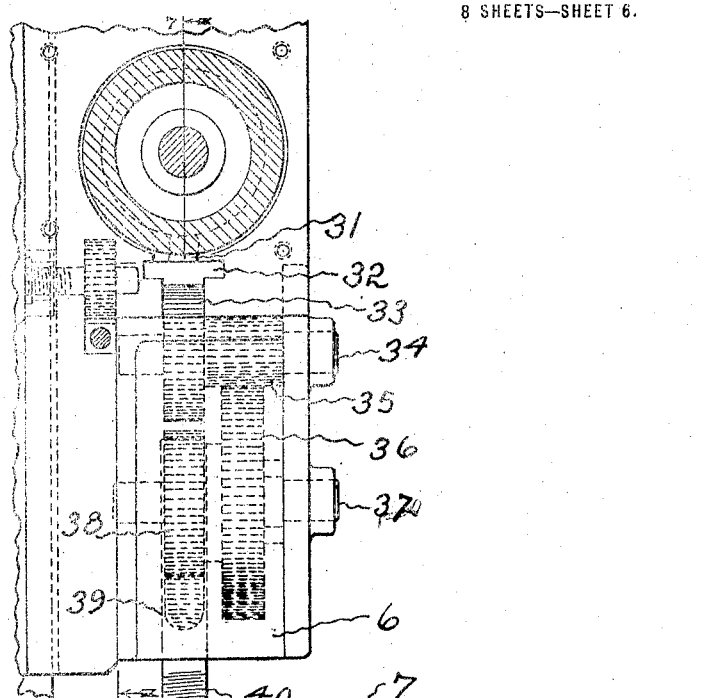
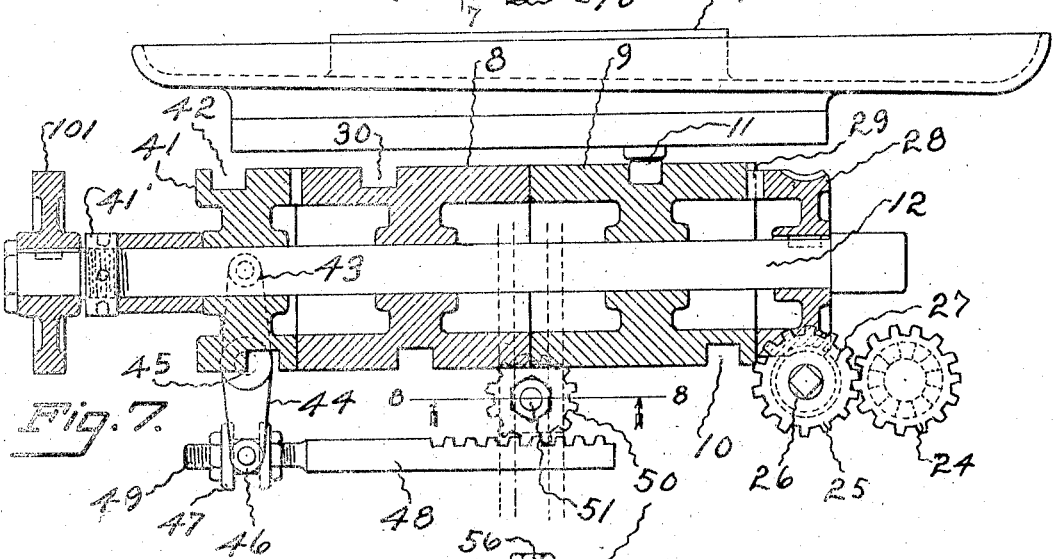
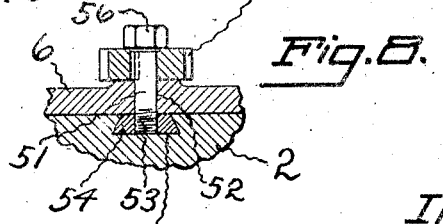

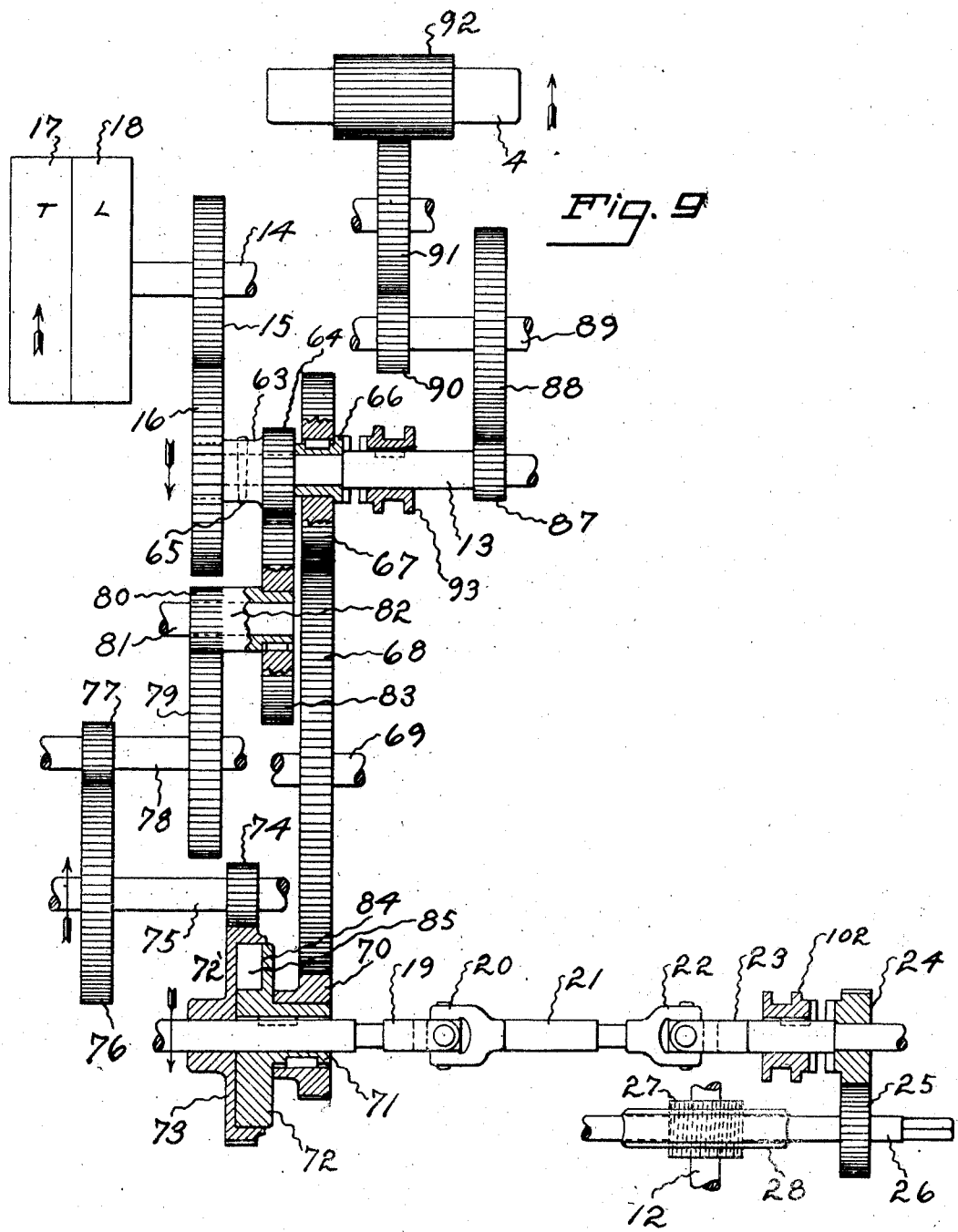

UNITED STATES PATENT OFFICE.

BENGT M. W. HANSON, OF HARTFORD, CONNECTICUT.

MILLING-MACHINE.

1,331,708.  Specification of Letters Patent.  Patented Feb. 24, 1920.

Application filed March 26, 1919. Serial No. 285,224.

*To all whom it may concern:*

Be it known that I, BENGT M. W. HANSON, a citizen of the United States, residing at Hartford, in the county of Hartford and State of Connecticut, have invented certain new and useful Improvements in Milling-Machines, of which the following is a specification.

This invention relates to milling-machines. The fundamental purpose I have in view is the provision of a machine of this character having the maximum range of possibilities. This condition I accomplish by the utilization of a plurality of slides. In that form of embodiment of the invention which I have selected for illustration in the drawings accompanying and forming part of the present specification one of these slides carries or sustains another, there being provided automatic means for causing or effecting the necessary movement or movements of the slides. One of these slides might be considered a primary slide and is desirably but not essentially mounted for movement in a vertical direction. Another slide might be considered the secondary slide, is supported by the primary slide for movement with it and also for movement in a direction transverse to the line of movement of the primary slide. It might be well to bear in mind that I use the designations "primary" and "secondary" merely as a matter of convenience and not necessarily to imply that one is subordinate to the other. In practice I can with the structure noted obtain all the effects which are possible with milling machines of the ordinary kind and moreover functions that are impossible with any milling-machine with which I am familiar, the machine in point of fact, being considerably more efficient than any other of which I have any knowledge and capable of performing an infinite number of different kinds of milling operations. The showing made by the present description and the drawings to which I have alluded, is really to enable those skilled in the art to comprehend my motives. I am in no sense restricted to this disclosure. I may depart therefrom in radically different ways within the scope of the invention defined by the claims following said description. While my initial motive or motives is as will be inferred, to provide a plurality of slides arranged in the manner set forth there are other features of equal importance, among them for illustration being means for effecting the proper operation of the said slides.

As will be inferred the means for effecting the necessary action of the slides in question may be automatically accomplished in various ways. I prefer, however, to use mechanism carried by one of the slides for instance what I have termed the "primary" slide, for effecting the action of the primary slide as well as the secondary slide although this may not be essential in all cases. It will be clear that by the compound action of the slides of which there are usually only two, I can mill forms of any character which are susceptible to being milled.

Referring to the drawings:

Fig. 2 is a front elevation of the upper portion of the machine as viewed for example from the lower side of Fig. 1.

Fig. 3 is a side elevation of the upper portion of the machine as viewed from right side of Fig. 1.

Fig. 4 is a side elevation of said upper portion of the machine as viewed from left side of Fig. 1.

Fig. 5 is a rear elevation of said upper portion as seen from the upper part for instance of Fig. 1 and opposite to that appearing in Fig. 2.

Fig. 6 is a vertical transverse section on the line 6—6 of Fig. 3 looking in the direction of the arrows.

Fig. 7 is a vertical section on the line 7—7 of Fig. 6 looking in the direction of the arrows and also illustrating the secondary slide.

Fig. 8 is a horizontal section on the line 8—8 of Fig. 7 looking in the direction of the arrows.

Fig. 9 is a diagrammatic view illustrating certain of the driving parts.

Figure 1:
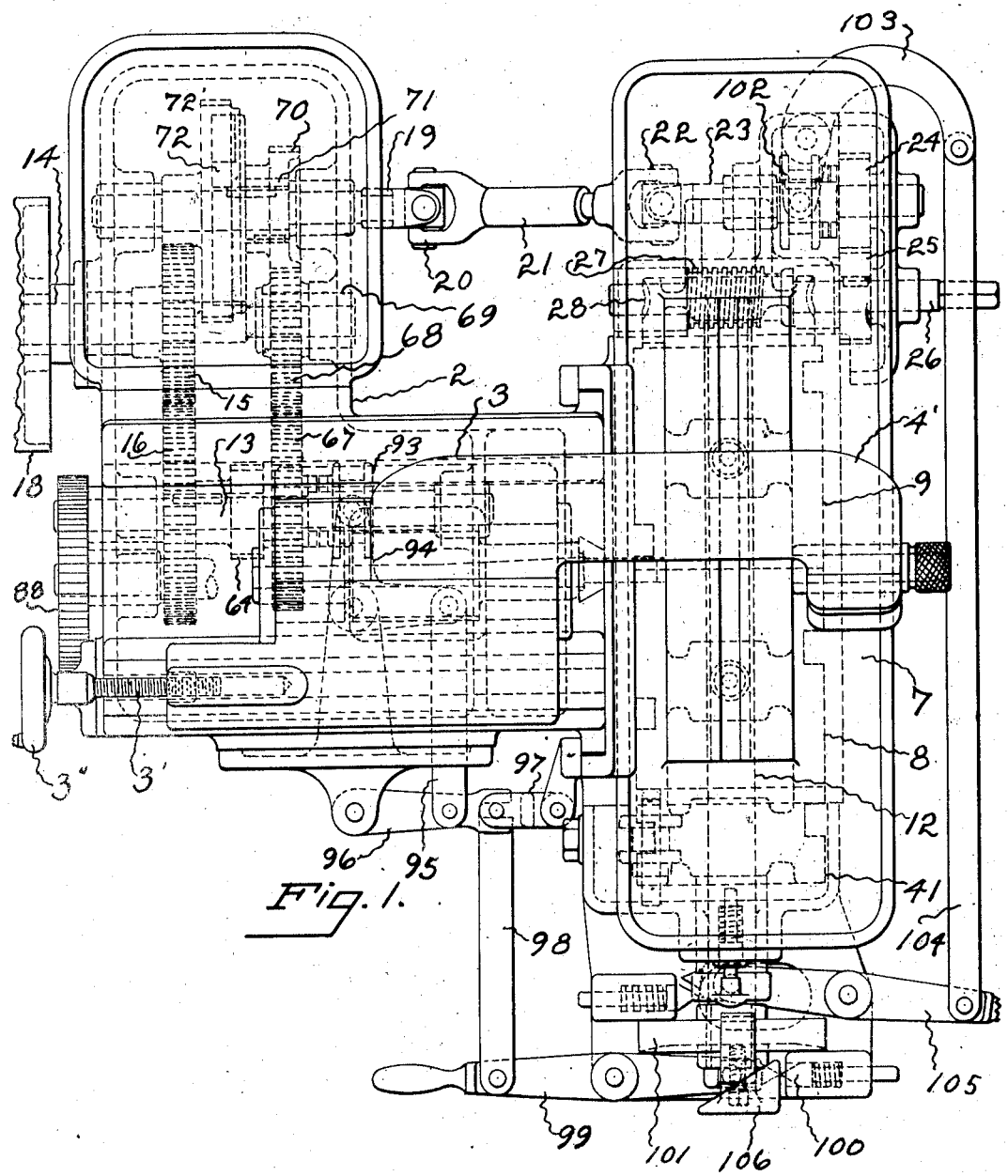
Figure 1 is a top plan view of a milling machine involving the invention.

Figs. 10 to 17 inclusive are diagrammatic views showing some of the different kinds of milling cuts.

Like characters refer to like parts throughout the several views.

The character of work which can be accomplished on the machine is practically infinite. In the structure shown and hereinafter described in detail, the same is organized for plain milling as it might be properly termed. In reality I can accomplish milling of any kind, the nature as already noted, being really without limit. After having described the machine as organized for accomplishing what I consider plain milling, I will somewhat briefly refer to several of the infinite arrangements utilized in other kinds of milling.

The machine as will be understood comprises a plurality of slides. Although I am not restricted in this regard, I prefer that there be two. They may within certain limits be related to each other in various manners. I have considered that where I provide two slides, one of them as being the primary slide and the other the secondary slide. The primary slide may for instance move, that is reciprocate, in a vertical direction. The secondary slide is desirably sustained by the primary slide and it moves or more properly reciprocates, in the present case, in a horizontal direction. In the organization shown, therefore, the secondary slide partakes of the movements of the primary slide but it has an independent movement. The work may obviously be of any character capable of being milled. It is of course supported by the slide mechanism by which I include the secondary slide. I prefer to carry the work directly upon what I have considered the secondary slide. There is involved also mechanism by which the slides are automatically operated. As a matter of compactness this mechanism is supported by the primary slide although this may not always be necessary. This mechanism in turn may be operated in any desirable manner, and it imparts to the primary slide the necessary motion, and functions similarly with respect to the secondary slide. This actuating mechanism carried by and generally within the primary slide, may be of any suitable nature although excellent results are obtained by cam mechanism, this cam mechanism acting through suitable instrumentalities to effect the proper action of both the primary and the secondary slides.

The framework for carrying the different parts of the machine may be of any suitable character, that shown comprising a frame-member as 2 which as illustrated is in the form of a column or upright. The frame-member or column supports at its upper end a bearing such as that denoted by 3, this bearing sustaining the shaft or spindle 4 to which a milling tool 5 may be connected. I will hereinafter describe a way for effecting the necessary rotation of the tool shaft 4 to effect the turning of the milling tool or cutter 5 and the resultant milling action.

As will be understood there is a primary slide such as 6. This primary slide is supported by the column or upright 2 for vertical movement, one or the other of the parts having suitable ways to properly guide the primary slide 6 in its necessary movements. The secondary slide 7 is supported by the primary slide, being gibbed thereto as common in milling and other metal-working machines. Necessarily when the primary slide 6 moves up or down as the case may be, the secondary slide partakes of such movements. In addition to this, however, the secondary slide may move, horizontally in the present case, on the primary slide. I have referred to the fact that ordinarily the way in which the work is supported is not necessarily a vital matter but I have noted that desirably it is carried upon a secondary slide of which that designated by 7 is an illustration. This slide 7 therefore will be provided with some means as quite common in milling and other machines, by which the work may be properly fixed thereto and which in itself constitutes no part of the invention.

The actuating mechanism for the primary and the secondary slides 6 and 7 may be as I have practically noted of any convenient character although cams such as 8 and 9 (Fig. 7) answer the requirements. These cams are of barrel or drum type and they are supported by and move with the primary slide 6, the latter being chambered in fact to receive the two cams. The cam 8 ordinarily acts through intermediate means upon the primary slide to effect its reciprocation while the cam 9 usually acts against the secondary slide 7 to perform a similar office with respect thereto. The cams are interchangeable yet it is proper to consider the one denoted by 8 as the primary cam and the one designated by 9 as the secondary cam for, as shown, they effect as arranged the desired motion of the primary and secondary slides respectively. The secondary cam 9 has in its periphery a race or way 10 in the form of a properly shaped groove adapted to receive a stud as the anti-friction roller 11 depending from the under side of the secondary slide 7. The cam race or way 10 is of such shape as to cause the full or complete reciprocation of the secondary slide 7 on each complete rotation of the cam drum 9.

These two cam drums may be supported in any desirable way, being shown as loosely carried by the shaft 12 disposed within the primary slide 6 and carried by suitable bearings thereon. The parts to which I have just referred are shown somewhat in detail in Figs. 6 and 7 and some of them appear in other views for instance Figs. 1 to 5 inclusive.

The power for effecting the desired automatic action of the slides may be derived from any suitable source for instance from the shaft 13, see for example Fig. 9 and also other figures such as Figs. 1 and 5. The main shaft 13 may be rotated in any convenient manner as for illustration by the means shown and now to be described. The frame-member 2 supports a shaft as 14 (Figs. 5 and 9) to which is fastened a spur gear 15 in mesh with a spur gear as 16 on the said main shaft 13. As shown the shaft 14 is equipped with tight and loose pulleys as 17 and 18 it being therefore evident that when a belt is on the tight pulley 17, the shaft 14 and hence the main shaft 13 through the intermediate described gears will be rotated to effect for instance through the aid of proper clutch or other means, the desired action of the vertical or primary slide 6 and the horizontal or secondary slide 7. I have not deemed it necessary to illustrate the belt which is shiftable as desired, between the tight and loose pulleys 17 and 18 respectively, nor have I deemed it necessary to show any motor by which the belt may be operated.

The frame-member 2 supports a power-driven member as the shaft 19 (Figs. 5 and 9 for instance) shown as connected by a universal joint as 20 to one end of the telescopic swinging shaft 21, the joint 20 (of "gimbal" type) being obviously interposed between what might be considered the outer section of this telescopic shaft 21 and the shaft 19. The other section of the swinging shaft is connected by a practically similar universal joint as 22 with the shaft 23 supported by suitable bearings upon the primary or vertical slide 6. The shaft 23 as a consequence partakes of the vertical movement of the primary or vertical slide and is in addition rotative thereon, being transversely located upon one side thereof.

The shaft 23 is shown as loosely carrying the spur gear 24 in mesh with a practically similar gear 25 fixed to the shaft 26 supported by suitable bearings upon the slide 6. This shaft 26 also has fastened to it as shown the worm 27 in mesh with the worm gear 28 which as shown (for instance Fig. 7) is fastened as by keying to the cam-drum-carrying shaft 12. It will be assumed that the shaft 23 is being rotated to effect the rotation of the shaft 12, that the cam drum 9 is clutched to the worm gear 28 through the intervention of the clutch means 29 and that the stud 11 is at what might be considered the low end of the cam groove or race 10. It will be understood that the race 10 on the cam drum 9 is so formed or shaped as to cause through the walls of the race or groove, acting upon the stud or roller 11, one complete stroke or reciprocation of the secondary or work-carrying slide 7. When the cam drum 9 is put into action the stud or roller 11 will be, as will be inferred, at the low part of the cam groove 10. On the turning therefore of said cam drum 9, the slide 7 will be first advanced during a part of which milling is occurring, and at the conclusion of the advance movement the return at once commences, the advance stroke in the present instance equaling the retractive stroke. At the conclusion of the latter the motion of the drum or cam 9 is arrested so as obviously to stop further movement of the work-supporting or horizontal slide 7.

As will be understood the cam cylinder or drum 9 is the means by which the secondary or horizontal slide 7 is usually reciprocated there being practically a direct coöperation between the two parts. The primary cam 8 is the means by which the vertical or primary slide 6 is ordinarily reciprocated although the effect of the primary cam is not in the present case directly applied to the primary slide. The said primary cam has in its periphery or circumference a race or groove 30 which is of such form as to effect through coacting parts, the reciprocation of the vertical or primary slide 6. The said cam race or groove 30 receives as shown, a stud or roller 31 (Figs. 3 and 6 for example) which is fastened to the upper side of the rack 32. The teeth of this rack are in mesh with a spur gear 33 fixed to the shaft 34. Said shaft 34 also has fixed to it a somewhat elongated spur or barrel gear 35 in mesh with the teeth of the spur gear 36 fastened to the shaft 37 which like the shaft 34, is supported by bearings upon the primary or vertical slide 6. Said shaft 37 also has fixed to it the spur gear 38 in mesh with the teeth of the rack 39 constituting a prolongation of the screw 40. This provides a simple way of adjusting vertically the rack 39. That is to say the endwise adjustment of the screw will be followed by a corresponding action of the rack 39 for a reason that will hereinafter appear. Normally, however, the rack 39 is stationary. It, therefore, follows that upon the rotation of the cam drum 8, the rack 32 will be through said roller, in the manner set forth, moved in an endwise direction to effect through the series of gears 33, 35, 36 and 38, the vertical movement of the primary or vertical slide 6, this slide being moved up or down in accordance with the direction of motion of the primary cam drum 8. It might be noted at this time that the said cam drum 8 is like the companion cam drum 9, given a complete rotation and that on each rotation of the respective cam drums, the respective slides will each be given one complete reciprocation or stroke.

There are several important points in connection with the two cam drums 8 and 9, to which I desire to call attention. They may be adjusted circumferentially relatively to each other. They are also removable and interchangeable with each other. That is, to say, the cam drum 8 can be utilized for reciprocating the slide 7, while the cam drum 9 can be employed through the aid of the coöperating described parts to effect the reciprocation of the slide 6 or cams of a different kind may be substituted therefor. The change gears described also play an important office in that they may be changed to effect the movement of the primary or vertical slide 6 at desired speeds. For illustration, the gears 35 and 36 may be interchanged.

As practically already observed the work is fastened in the customary way to the secondary slide 7. On the advance stroke of this secondary slide during which it travels upon the primary slide 6, the tool or cutter will mill the work. As a matter of fact it is possible with the machine to travel in one direction on one stroke of a slide and to travel in an altogether different path or contour on the opposite stroke, as shown for instance by Figs. 14, 15 and 17, hereinafter described, the machine as I have virtually indicated being practically universal in its action. The primary slide is of course lifted or raised about the time the secondary slide is to advance so that when such advance does commence, the work will be in position to be acted upon by the cutter or tool. This, it will be understood, is merely one of the endless number of ways in which the machine can be used and in the particular procedure to which I am now referring, the primary slide is held in a fixed position during practically the major part of the advance of the secondary slide and is lowered when the milling operation has been concluded so that as the secondary slide returns to its initial position the result to which I have alluded can occur. There may be instances where the action described is not necessary for as to one of its aspects, the invention is broad as to this point. I might also add at this juncture that in the case of which I have specifically referred the secondary slide is advanced at a low or slow speed and is retracted at a rapid speed and I will hereinafter refer to a way by which this condition can be accomplished. I have noted the fact that there may be cases where a primary slide as 6 is held in a fixed relation during a determined or definite length of time.

I will now set forth a mechanism by which this particular result can be obtained. The shaft 12 to which I have referred has loose upon it (Fig. 7) the cam drum 41 having in its circumference the race or way 42. As shown this race or way 42 receives in it the stud or anti-friction roller 43 carried as represented, upon the upper arm of the rock-lever 44 pivotally supported between its ends as at 45 upon the primary slide 6. The lower arm of this rock lever 44 is shown provided with a yoke or fork 46 straddling the collar 47 on the outer end of the bar 48, this bar being as shown, toothed on its upper side so as to constitute a rack bar and acting, as I will hereinafter explain. The branches of the yoke or fork 46 are furnished with pins which enter a circumferential groove in the collar 47 all as shown in several views and particularly in Fig. 7. The teeth of the rack bar 48 are in mesh with those of a pinion 50 supported for rotation as by keying with a stub shaft or pin 51. Said pin 51 extends through a hole as 52 in the primary slide 6 (Fig. 8) and it has at its inner end a feed connection obtained by threading as at 53, with the gib member or locker 54 shown as dove-tailed in a vertical groove or channel as 55 extending vertically of the column 2. The outer end of the stub shaft or pin 51 has fastened to it a bearing as 56. The construction to which I am in part referring presents a way of binding or positively holding the primary or vertical slide 6 in a predetermined position and while it is advantageous, it is merely illustrative. When the gib, clamping member or locker 54 is not set, it will be understood that the slide 6 may freely move vertically and during this time the said gib travels in the channel or groove 55. The several cams 8, 9 and 41 are fixed in their operative positions for example by a nut 41' on the shaft 12.

I have referred to the fact that the secondary slide 7 may drop clear of its cutter by the movement of the primary slide 6, this being understood is merely illustrative of one function obtained by the machine. I am enabled in fact to mill automatically in different directions. These may be at right angles to each other, one for example being vertical and the other horizontal. As a matter of fact I can mill along curved paths, having called attention to the virtual universality of the machine.

I provide means for adjusting the primary or vertically reciprocatory slide 6 so that the same may be initially positioned to effect desired results and while obviously this particular condition can be accomplished in various ways, the rack bar 39 or rather the screw 40 of which said rack bar is a continuation or prolongation, functions in this particular. The frame-member or column 2 supports a bearing as 57 which in turn supports the meshing bevel gears 58 and 59, the screw 40 extending through and being in threaded engagement with the bevel gear 59 which as a result operates as a nut. The screw has a key-connection as 60 with the nut portion of the bevel gear 59 or with said bevel gear itself, the result being that when the bevel gear 59 is rotated, the screw 40 and hence the rack bar 39 will be fed endwise but neither of them will turn. The bevel gear 58 is fastened in some suitable way to the shaft 61 supported by the bearing or bracket 57 and is shown having a hand wheel 62 by which it may be turned. It will be assumed that it is desired to vertically adjust the slide 6 and as a consequence the slides 6 and 7 either down or up. During this adjustment, the power will be off at least so far as feed movement of the two slides is concerned, and the train of gears 33, 35, 36 and 38 will be at rest and prevented from rotating by the cam roller 31 so that when the hand wheel 62 is turned the screw 40 may be moved endwise, either up or down, depending upon the direction in which the hand wheel is turned to thus effect the vertical adjustment of the two slides 6 and 7. I have already explained that the several gears 34, 35, 36 and 38 are carried by the slide 6 for not only rotation thereon but for movement therewith.

It will be understood that the reciprocation of the two slides 6 and 7 is secured through the operation of the cam shaft 12. This cam shaft 12 may be driven at variable or differential speeds or velocities. During the described milling action on what is considered the advance movement of the secondary slide 7 at which time the primary slide may be prevented from movement, the travel thereof will be slow while the return movement or back stroke may be rapid. These particular conditions are effected in the present case as will be understood, through the proper control or action of the cam shaft 12. I will set forth a means by which this is possible and in this connection will refer to Figs. 2, 5, 7 and 9 for instance. The power shaft 13 it will be recalled, rigidly carries a spur gear 16 which in the manner already described derives its motion from the pulley 17 as I have already set forth. The gear 16 has an elongated hub 63 (Fig. 9) with which is rigid the spur gear 64, the said hub being fastened to the main shaft 13 in some suitable way as by the pin 65. The shaft 13 also loosely supports the bushing 66 to which is fastened as by keying or otherwise the gear 67.

The gear 67 meshes with the large gear 68 on the shaft 69 which in turn meshes with the pinion 70 fastened as by keying, to the hub 71 rigid with the disk 72 keyed to the shaft 19 for rotation therewith. This disk 72 constitutes one member of a clutch 72', the other member comprising the cupped gear 73. The gear 73 is loose on the shaft 19 and its teeth mesh with those of the pinion 74 fastened to the shaft 75 to which is also fastened the gear 76 in mesh with the pinion 77 fixed to the shaft 78, said shafts 75 and 78 being supported by suitable bearings on the frame of the machine. The shaft 78 has also fixed to it a gear 79 in mesh with the gear 80 loose on the shaft 81 and having an elongated hub 82 to which is keyed the gear 83 in mesh with the pinion 64 to which I have already referred. I have described two trains of gears, one involving the gears 67, 68 and 70 adapted to drive the shaft 19, when the gear 67 is clutched to the shaft 13 so that said shaft 19 as a consequence can be driven at its high rate of speed during which the secondary slide 7 is retracted. The advance or slow feed movement of said slide 7 during which cutting action takes place, is brought about through the gears 64, 83, 80, 79, 77, 76, 74 and the clutch 72', it being understood that during the slow feed, the gear 67 is out of driving relation with the shaft 13.

This mechanism which I am now describing is shown quite fully in Fig. 9 and parts of its appear in other views such as Figs. 1, 2, 4 and 5. The disk or clutch member 72 has in its periphery the pocket 84 in which is situated the dog 85 normally pressed against the inner surface of the flange or peripheral portion of the cupped gear 73 by the spring plunger 86 (Fig. 4), so that on the rotation of the gear 73, the disk or clutch member 72 will be operated. It will of course be understood that the gear 73 must overtake the dog 85 to secure the desired toggle clutch driving action.

Fixed to the shaft 13 is the pinion 87 in mesh with the gear 88 fastened to the shaft 89 which fixedly carries the gear 90 in mesh with the gear 91 in turn in mesh with the barrel pinion 92 fastened to the tool-spindle or shaft 4. It will be understood therefore that when the shaft 13 is being rotated, the tool-spindle 4 will also be rotated.

To the shaft 13 is keyed or otherwise fitted for rotation therewith, the clutch-member 93 adapted through suitable means to be thrown into driving relation with the gear 67 when it is desired to drive the shaft 19 and hence the parts receiving their motion therefrom, at a high speed. Any suitable means may be provided for thus operating the clutch-member 93. The means shown for accomplishing this purpose will now be set forth. The frame of the machine (Fig. 1 for example) pivotally supports at its elbow, the angle-lever 94, one branch of which lever is connected with the said clutch member 93, the other branch being jointed to the link 95. While the inner end of the link is jointed to the angle-lever 94, the outer end is similarly connected to the lever 96 constituting in effect one member of a toggle, the other member of the toggle being made up of the link 97, pivoted to the slide 6. There is jointed to the lever 96 and the link 97 where they are connected, the rod 98 likewise united to the hand lever 99 pivotally mounted between its ends to the slide 6 and adapted to be held in its respective positions by a detent or spring-actuated plunger 100. By grasping the handle of the lever 99 and swinging the same inward, the clutch-member 93 will be caused to engage the bushing 66 to thus clutch the gear 67 to the shaft 13 and as a consequence drive the shaft 13 at its high speed.

It will be understood that the reciprocatory motions of the primary slide 6 and secondary slide 7 are received through intermediate means from the main shaft 13. I have described two trains of parts whereby the shaft 21 can be operated either at a rapid or slow rate of speed from said shaft 13 and also how the motion of said shaft 21 is transmitted through intermediate means, to the shaft 12 to rotate the primary and secondary cams 8 and 9 respectively to obtain through the described parts the reciprocation of the primary and secondary slides 6 and 7 respectively. The shaft 12 has fixed as by keying to one end thereof, the left as shown in Fig. 7, the disk or wheel 101. This wheel also appears in other views such as Figs. 1, 2 and 3. It is adapted through suitable dogs as I will later explain, to carry automatically into effect certain actions one of which for illustration, is the advance of the secondary slide to which the work is fastened, at differential or variable speeds. To elaborate: It is necessary if not desirable that the secondary slide be advanced up to a point where the tool will operate upon the work at a rapid speed, to continue the advance during the milling operation at a low or slow speed, and to conclude the stroke at a rapid speed, the return stroke being rapid. Of course these conditions may vary. As a matter of fact virtually the complete advance stroke of the secondary slide might have to be made at a slow speed, owing to the fact that a cut of considerable length is being made. I can as will be clear obtain these different conditions as I will later more fully set forth.

It will be remembered that the primary slide 6 supports for movement therewith the shaft 23 and it is this shaft of course which is driven at the variable speeds. This shaft 23 carries the clutch member 102 (Fig. 9 see also for example Fig. 1). The clutch member 102 is coöperative with the spur gear 24, the two being shown as separated in Fig. 9. Associated with the clutch member 102 is the shifting lever 103 pivotally supported between its ends upon the primary slide, the long curved branch of said lever 103 being pivoted to one end of the rod 104 extending completely across the front of the primary slide and jointed at its opposite end to the hand lever 105 supported pivotally by a bearing or bracket on said primary slide. It will be assumed that the shaft 19 is in motion and that the clutch member 102 is free of the spur gear 24 in the manner shown in said Fig. 9. To start the slides the clutching member 102 will be caused to engage the spur gear 24 to thus effect through the intermediate parts the rotation of the shaft 23. On the rotation of the shaft 12 the cam drums 8 and 9 are rotated to effect in the manner already set forth the reciprocation of the primary and secondary slides. The disk or wheel 101 is provided with adjustable dogs 106 adapted to act against the lever 99 when it is desired from the latter, to move the clutch member 93 into or out of engagement with the bushing 66 to secure either the rapid or the slow motion of the shaft 21. It will be clear that when the clutch member 93 is engaged with the bushing 66 the shaft 21 will be driven at its rapid speed so as to effect a corresponding motion of the shaft 12, whereas if these parts be disengaged the slow speed of said shaft 12 will be the result.

It will be assumed that a belt is on the pulley 17 and that as a result the shaft 13 through the intermediate described parts is being driven to effect through the intervention of the described gears the rotation of the spindle or shaft 4. A piece of work will now be fastened to the secondary slide 7 assumed to be in its extreme retracted position.

The stud 11 and the stud 31 will be at the low parts of the cam grooves 10 and 30 respectively. The lever 105 will now be operated so as to cause through the intermediate parts, the engagement of the clutch member 102 with the gear 24 and thus the operation through the described parts of the shaft 12 to effect the concurrent rotation of the cams 8 and 9. The cam 9 acting against the stud 11 will cause the reciprocation of the slide 7 on the slide 6. During the advance or forward movement of the slide 7, the slide 6 is clamped to the frame in the manner described. At the conclusion of the advance the slide 6 will be unclamped from the frame when the cam 8 as set forth will cause the lowering of the slide 6 and the cam 9 at the same time will retract the slide 7, this motion being usually a rapid one caused by the rapid rotation of the shaft 12 in the manner I have pointed out. About the time that both slides 6 and 7 have assumed their extreme backward positions, a dog or tappet as 107 on the disk or wheel 101 will engage the lever 105 and thus through the described parts, disengage the clutch member 102 from the gear 24 and as a result stop further movement of the two slides, this particular result being virtually at the point when the slides are in their extreme backward positions.

It will be remembered that I have alluded to the fact that the machine is practically universal in its action; this is a fact. I have also described further the operation somewhat in detail of the machine for accomplishing work of a specific nature. In Figs.

10 to 17 inclusive I have illustrated diagrammatically some of the many kinds of work capable of being done on the machine.

Figure 10:
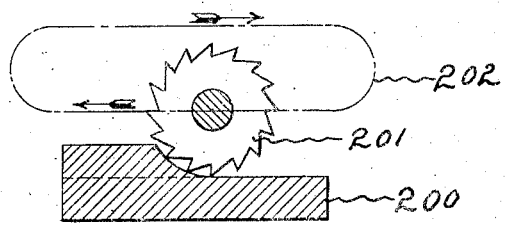

In this connection I will first refer to Fig. 10. The work is designated by 200, the cutter by 201 and the elliptical line by 202. This particular line virtually represents the path relatively followed by the cutter 201 during the joint movement of the primary and secondary slides 6 and 7. In this event the secondary slide reciprocates on the primary slide. During the advance of the secondary slide on the primary slide the tool is milling and at the conclusion of the milling action or slightly beyond this point, the secondary slide is freed from the work, by the lowering of the main slide, ascending in fact when the secondary slide has practically reached its initial position, the result being that as I have stated the cutter relatively takes an elliptical course. This will not be so actually because the cutter really turns about a fixed axis.

Figure 11:
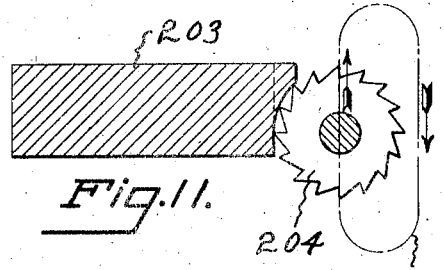

In Fig. 11, the work is denoted by 203 and the cutter by 204, the path of travel being designated by 205. The milling in this case is done while the work is fastened to the secondary slide 7 and the primary slide 6 is reciprocating, the secondary slide having of course no independent movement.

Figure 12:
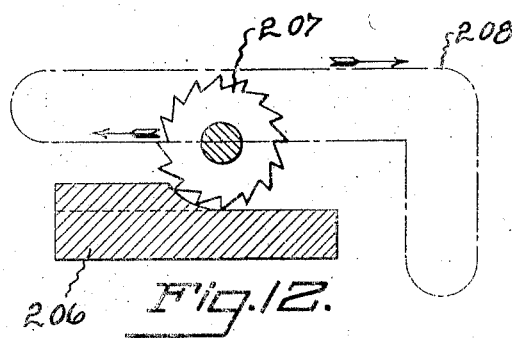

In Fig. 12, a different condition is illustrated, the work being designated by 206 and the cutter by 207. The course of travel is a path denoted by 208, the path being angular, and the cutter milling on the work during the movement of the primary slide 6 and subsequently during the movement of the secondary slide.

Figure 13:
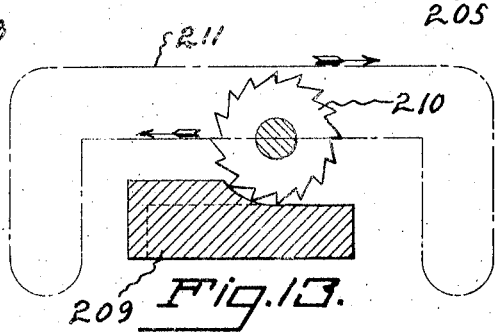

In Fig. 13 the work is designated by 209, the cutter by 210 and the course of travel by 211. In this event the milling is done first on the downstroke or advance of the primary slide, then on the advance of the secondary slide, and finally on the retraction of the primary slide.

Figure 14:
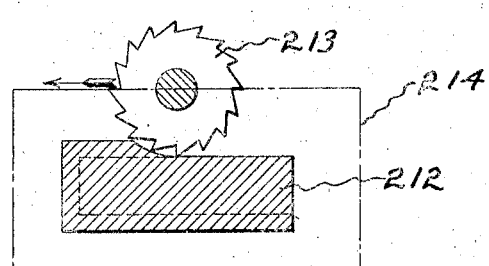

In Fig. 14 the work is designated by 212, the cutter by 213 and the line of cut by 214. In this case the mill is accomplished on all four sides of the work, the line of cut being a complete rectangle.

Figure 15:
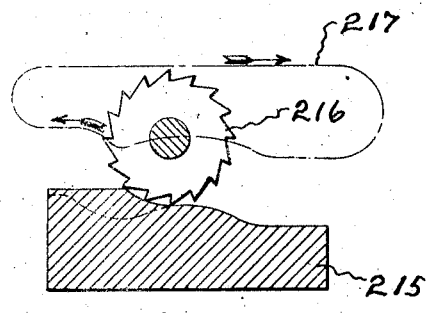

In Fig. 15 the work is denoted by 215 the cutter by 216 and the line of movement by 217. In this case the part or work 215 requires a fluted or corrugated mill to be made; this is accomplished through the joint action of the primary and secondary slides 6 and 7 respectively.

Figure 16:
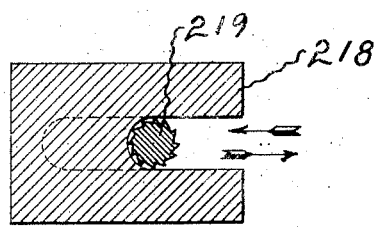

In Fig. 16, the work is denoted by 218, the cutter by 219. This shows how a cut or aperture may be milled.

Figure 17:
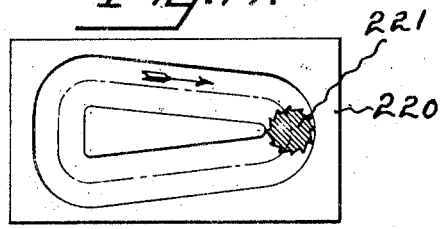

In Fig. 17 I finally show the last of these several of a multitude of different kinds of work. In this particular case the work is designated by 220 and the cutter by 221, being a circuitous groove, which is milled by the proper movements of the primary and secondary slides. In fact it will be obvious that the work which can be milled is practically limitless.

I wish to call attention to the fact that the bearing 3 to which reference has been hereinbefore briefly made, is as shown, although this may not always be necessary, in the form of a head-stock which transversely is adjustable on the top of the frame-member 2, through the agency, for instance, of a screw 3′ operable by the hand wheel 3″. In the illustration made, this adjustable bearing or head-stock 3 is furnished with an arm 4′ which overhangs the milling tool of whatever character it may be, that which I have described being designated by 5.

What I claim is:

1. A milling machine comprising a plurality of slides one of which is supported by another, means for supporting a milling tool in position to act on work carried by the slide mechanism, and automatic mechanism for causing distinct movements of the slides, the mechanism involving means carried by one of the slides for effecting the movement of one of them.

2. A milling machine comprising a plurality of slides one of which is supported by another, means for supporting a milling tool in position to act on work carried by the slide mechanism, and automatic mechanism carried by one of the slides and acting on both of them to cause their movement in transverse directions.

3. A milling machine comprising a plurality of slides one of which is supported by another, means for supporting a milling tool in position to act on work carried by the slide mechanism, and automatic mechanism for causing distinct movements of the slides in transverse directions, the mechanism involving means carried by the slides and also involving a cam to act against one of the slides.

4. A milling machine comprising a plurality of slides one of which is supported by another, means for supporting a milling tool in position to act on work carried by one of the slides, and cam mechanism carried by the slide mechanism for reciprocating them.

5. A milling machine comprising a plurality of slides one of which is supported by another, means for supporting a milling tool in position to act on work carried by one of the slides and mechanism involving cam means, carried by the other slide, for reciprocation of them both.

6. A milling machine comprising a plurality of slides one of which is supported by another, means for supporting a milling tool in position to act on work carried by one of the slides, a plurality of cams supported by the other slide, means for transferring the effect of the cams to the respective slides for operating the same, and means for operating the cams.

7. A milling machine comprising a primary slide, a secondary slide supported by the primary slide and reciprocatory in a direction transverse to the movement of the primary slide, a plurality of rotary cams carried by the primary slide, means for transferring the effect of the cams to the slides, for operating the latter, and means for supporting a milling tool in position to act on work on the secondary slide.

8. A milling machine comprising a primary slide supported by the frame work of the machine, a secondary slide supported by the primary slide, and reciprocatory in a direction transverse to the movement of the primary slide, means for supporting a milling tool in position to act on work carried by the secondary slide, and automatic mechanism for causing distinct movements of the slides in transverse directions.

9. A milling machine comprising a primary slide supported by the frame work, a secondary slide supported by the primary slide and reciprocatory in a direction transverse to the movement of the primary slide, and a plurality of rotary cams carried by the primary slide, means for transferring the effect of the cams to the slides for operating the latter, and means for supporting a milling tool in position to act on work on the secondary slide.

10. A milling machine comprising a plurality of slides one of which is supported by another, means for supporting a milling tool in position to act on work carried by one of the slides, separate cams carried by one of the sides, and means operable by the cams for reciprocating the slides in transverse directions.

11. A milling machine comprising a plurality of slides one of which is supported by another, means for supporting a milling tool in position to act on work carried by one of the slides, separate cams removably carried by one of the slides, and means operable by the cams, for reciprocating the slides in transverse directions.

12. A milling machine comprising a plurality of slides one of which is supported by another, means for supporting a milling tool in position to act on work carried by one of the slides, separate cams supported within one of the slides, and means operable by the cams, for reciprocating the slides in transverse directions.

13. A milling machine comprising a plurality of slides one of which is supported by the framework of the machine and the other of which is carried by a companion slide, means for supporting a milling tool in position to act on the slide which is carried by said companion slide, cams sustained by the slide on the framework, and means for transferring the effect of the cams to the respective slides, to reciprocate the same in transverse directions.

14. A milling machine comprising a primary slide, a secondary slide sustained by the primary slide, means for sustaining a milling tool in position to act on work carried by the secondary slide, cams on the primary slide, and means for transferring the effect of the cams to the respective slides to move the same in transverse directions.

15. A milling machine comprising a primary slide, a secondary slide sustained by the primary slide, means for supporting a milling tool in position to act on work carried by the secondary slide, cams located within and carried by the primary slide, and means for transferring the effect of the cams to the respective slides to move the same in transverse directions.

16. A milling machine comprising a primary slide, a secondary slide sustained by the primary slide, means for supporting a milling tool in position to act on work carried by the secondary slide, cams carried by the primary slide, means for transferring the effect of the cams to the respective slides to move the same in transverse directions, and means for operating the cams at different speeds.

17. A milling machine comprising a primary slide, a secondary slide sustained by the primary slide, means for supporting a milling tool in position to act on work carried by the secondary slide, cams carried by the primary slide, means for transferring the effect of the cams to the respective slides to move the same in transverse directions, and mechanism for operating one of the cams at different speeds, and the other cam independently at different speeds.

18. A milling machine comprising a primary slide, a secondary slide sustained by the primary slide, means for supporting a milling tool in position to act on work carried by the secondary slide, cams carried by the primary slide, means for transferring the effect of the cams to the respective slides to move the same in transverse direction.

19. A milling machine comprising a primary slide, a secondary slide sustained by the primary slide, means for supporting a milling tool in position to act on work carried by the secondary slide, cams carried by the primary slide, said primary slide being supported by the framework of the machine, means for transferring the effect of the cams to the respective slides to move the same in transverse directions, and means for clamping the primary slide to the framework, for a predetermined time.

20. A milling machine comprising a slide, means for supporting a milling tool in position to act on work carried by the slide, a cam, means for transferring the effect of the cam to the slide to reciprocate the same, means for causing an independent movement of the slide, a shaft, means for transferring the effect of said shaft to said cam, a second shaft, and connections between the two shafts involving a telescopic member.

21. A milling machine comprising a slide, means for supporting a milling tool in position to act on work carried by the slide, a cam, means for transferring the effect of the cam to the slide to reciprocate the same, means for causing an independent movement of the slide, a power-transferring member, means for transferring the effect of said power transferring member to said cam, a second power-transferring member, and operative connections between the two power-transferring members, involving a telescopic shaft.

22. A milling machine comprising a slide, means for supporting a milling tool in position to act on work carried by the slide, a cam, means for transferring the effect of the cam to the slide to reciprocate the same, means for causing an independent movement of the slide transverse to its other movement, a power transferring member and means for transmitting the effect of said power transferring member to said cam on the said independent movement of said slide.

23. A milling machine comprising a slide, means for supporting a milling tool in position to act on work carried by the slide, a cam, means for transferring the effect of the cam to the slide to reciprocate the same, means for causing an independent movement of the slide transverse to its other movement, and power operable means for operating upon said cam on said independent movement of said slide.

24. A milling machine comprising a slide, means for supporting a milling tool in position to act on work carried by the slide, a cam, means for transferring the effect of the cam to the slide to reciprocate the same, means for causing an independent movement of the slide transverse to its other movement, and means involving a telescopic swinging shaft, for operating upon said cam on said independent movement of said slide.

25. A milling machine comprising a slide, means for supporting a milling tool in position to act on work carried by the slide, a cam, means for transferring the effect of the cam to the slide to reciprocate the same, means for causing an independent movement of the slide transverse to its other movement, a power-transferring member, means for causing the rotation of said power transferring member at different speeds, and means for transferring the effect of said power-transferring member to said cam.

26. A milling machine comprising a slide, means for supporting a milling tool in position to act on work carried by the slide, a cam, means for transferring the effect of the cam to the slide to reciprocate the same, means for causing an independent movement of the slide, the cam being movable with said slide during said independent movement, and means for operating said cam at different speeds.

27. A milling machine comprising a slide, means for supporting a milling tool in position to act on work carried by said slide, a cam, means for transferring the effect of said cam to said slide to reciprocate the same, means for causing an independent movement of the slide transverse to its other movement, a power-transferring member, a second power transferring member movable with said slide and means involving a swinging telescopic member, for transferring the effect of the first power-transferring member to the second power-transferring member.

28. A milling machine comprising a slide, a cam, means for transferring the effect of said cam to said slide to reciprocate the same, means for causing an independent movement of the slide transverse to the other movement, a power-transferring member, means for transferring the effect of said power-transferring member to the cam on said independent movement, and means for operating said power-transferring member at different speeds.

29. A milling machine comprising a slide, a cam on the slide, and means operated by the cam and supported by the frame of the machine, for effecting the movement of the slide.

30. A milling machine comprising a slide, a rotary cam on the slide, and means operated by the cam and supported by the frame of the machine, for effecting the movement of the slide.

31. A milling machine comprising a slide, a rotary cam on the slide, power-actuated means for operating said cam, and means between the cam and the frame of the machine, for effecting the movement of the slide.

32. A milling machine comprising a slide, a cam on the slide, means for operating said cam, and means involving change gears, between the cam and the frame of the machine, for effecting the movement of the slide.

33. A milling machine comprising a slide, a rotary cam on the slide, and means involving a normally stationary rack, between the cam and the frame of the machine, for effecting the movement of the slide.

34. A milling machine comprising a slide, a rotary cam supported by the slide, means for rotating said cam during the motion of the slide, and means between the cam and the frame of the machine for effecting the movement of the slide.

35. A milling machine comprising a slide, a rotary cam supported by said slide, a rack also supported by the slide and reciprocatory by the cam, speed change gears including members, one of the gears being operable by said rack, and a normally stationary rack in mesh with another of the gears.

36. A milling machine comprising a reciprocatory slide, a rotary cam supported by said slide, a rack on the slide reciprocatory by the cam, a gear in mesh with the rack, a normally stationary rack, a gear in mesh with the second rack, change gears between and coöperative with the two other gears.

37. A milling machine comprising a reciprocatory slide, a rotary cam supported by said slide, a rack on the slide reciprocatory by the cam, a gear in mesh with the rack, a normally stationary rack, a gear in mesh with the second rack, change gears between and coöperative with the two other gears, and means for adjusting the last mentioned rack.

38. A milling machine comprising a slide, a rotary cam supported by said slide, a rack on the slide reciprocatory by said cam, a gear on the slide in mesh with the rack, a second rack supported by the frame of the machine, a gear in mesh with the second rack also carried by the slide, and change gears mounted on the slide between and coöperative with the other gears.

39. A milling machine comprising a slide, a cam on the slide, a rack on the slide, reciprocatory by the cam, a second rack, a gear in mesh with the second rack, means for transferring the effect of the second gear to the first gear, and a rotary nut on the frame, the second rack having a threaded portion extending through the nut.

40. A milling machine comprising a primary slide, a secondary slide supported for reciprocation by the primary slide, a primary cam on the primary slide, a secondary cam on the primary slide, means actuated by the secondary cam, for reciprocating the secondary slide, and means between the primary cam and the framing of the machine, for effecting the reciprocation of the primary slide.

41. A milling machine comprising a primary slide, a secondary slide supported for reciprocation by the primary slide, a primary cam on the primary slide, a secondary cam on the primary slide, means actuated by the secondary cam, for reciprocating the secondary slide, means between the primary cam and the framing of the machine, for effecting the reciprocation of the primary slide, and means for rotating the two cams at predetermined speeds.

42. A milling machine comprising a primary slide, a secondary slide supported for reciprocation by the primary slide, a primary cam on the primary slide, a secondary cam on the primary slide, both of the cams being removably mounted, means actuated by the secondary cam, for reciprocating the secondary slide, and means between the primary cam and the framing of the machine, for effecting the reciprocation of the primary slide.

43. A milling machine comprising a primary slide, a secondary slide supported for reciprocation by the primary slide, a primary cam on the primary slide, a secondary cam on the primary slide, means actuated by the secondary cam, for reciprocating the secondary slide, and means involving change gears, between the primary cam and the framing of the machine, for effecting the reciprocation of the primary slide.

44. A milling machine comprising a primary slide, a secondary slide, supported for reciprocation by the primary slide, a primary cam on the primary slide, a secondary cam on the primary slide, means directly operable by the secondary cam, for effecting the reciprocation of the secondary slide, and means between the primary cam and the framing of the machine for effecting the reciprocation of the primary slide.

45. A milling machine comprising a primary slide, a secondary slide, supported for reciprocation by the primary slide, a primary cam on the primary slide, a secondary cam on the primary slide, means actuated by the secondary cam, for reciprocating the secondary slide, a rack on the primary slide, means actuated by the primary cam, for reciprocating said rack, a second rack on the framing of the machine, a gear in mesh with the second rack, and means for transferring the effect of the second gear to the first gear, to effect the reciprocation of the primary slide on the rotation of the primary cam.

46. A milling machine comprising a primary slide, a secondary slide supported for reciprocation by the primary slide, a primary cam on the primary slide, a secondary cam on the primary slide, means actuated by the secondary cam, for reciprocating the secondary slide, means between the primary cam and the framing of the machine, for effecting the reciprocation of the primary slide, and means for positively clamping the primary slide to its support at a predetermined point in the reciprocation thereof.

47. A milling machine comprising a primary slide, a secondary slide supported for reciprocation by the primary slide, a primary cam on the primary slide, a secondary cam on the primary slide, means actuated by the secondary cam, for reciprocating the secondary slide, means between the primary cam and the framing of the machine, for effecting the reciprocation of the primary slide, and means for positively clamping the primary slide to its support at a predetermined point.

48. A milling machine comprising a primary slide, a secondary slide supported for reciprocation by the primary slide, a primary cam on the primary slide, a secondary cam on the primary slide, means actuated by the secondary cam, for reciprocating the secondary slide, means between the primary cam and the framing of the machine, for effecting the reciprocation of the primary slide, and means involving a cam, supported by the primary slide, for positively clamping the primary slide to its support at a predetermined point in the reciprocation thereof.

49. A milling machine comprising a primary slide, a secondary slide supported for reciprocation by the primary slide, a primary cam on the primary slide, a secondary cam on the primary slide, means actuated by the secondary cam for reciprocating the secondary slide, means between the primary cam and the framing of the machine, for effecting the reciprocation of the primary slide, and means involving a cam, supported by the primary slide, for positively clamping the primary slide to its support at a predetermined point in the reciprocation thereof, the several cams being coaxial with each other.

In testimony whereof I affix my signature in the presence of two witnesses.

BENGT M. W. HANSON.

Witnesses:
  ALVAN WALDO HYDE,
  HEATH SUTHERLAND.